United States Patent [19]

Miyamoto et al.

[11] Patent Number: 5,886,108
[45] Date of Patent: Mar. 23, 1999

[54] PROCESS FOR HYDROGENATING CONJUGATED DIENE POLYMER

[75] Inventors: Koichi Miyamoto, Yokohama; Yuichi Kitagawa, Kawasaki; Sigeru Sasaki, Yokohama, all of Japan

[73] Assignee: Asahi Kasei Kogyo Kabushiki Kaisha, Osaka, Japan

[21] Appl. No.: 947,462

[22] Filed: Oct. 9, 1997

[30] Foreign Application Priority Data

Jun. 30, 1997 [JP] Japan .................................. 9-174469

[51] Int. Cl.$^6$ ...................................................... C08F 8/04
[52] U.S. Cl. ................... 525/338; 525/332.8; 525/332.9; 525/333.1; 525/333.2; 525/339
[58] Field of Search ..................................... 525/338, 339

[56] References Cited

U.S. PATENT DOCUMENTS 5,244,980  9/1993  Gibler et al. .
5,334,566  8/1994  Gibler et al. .

FOREIGN PATENT DOCUMENTS 1-275605  6/1989  Japan .

*Primary Examiner*—Bernard Lipman
*Attorney, Agent, or Firm*—Birch, Stewart, Kolasch & Birch, LLP

[57] ABSTRACT

A process for hydrogenating a conjugated diene polymer, which process comprises the steps of: deactivating a conjugated diene polymer which is prepared by using an organic alkali metal compound as a polymerization initiator by adding a deactivator; and contacting the deactivated diene polymer with hydrogen in an inert hydrocarbon solvent to hydrogenate the double bond of the deactivated diene polymer, wherein the hydrogenation is carried out (i) in the presence of a catalyst selected from organometallic compounds represented by the following formula:

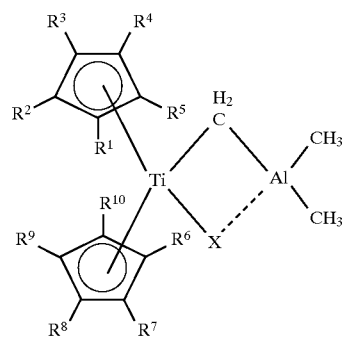

wherein the symbols are defined in the specification and (ii) under a condition satisfying the following relationship:

$$-6 < (M-Z+Al-Ti)/Ti < 2$$

wherein M represents the molar amount of the organic alkali metal compound; Z represents the molar amount of the deactivator; Al represents the molar amount of an organoaluminum compound; and Ti represents the molar amount of an organotitanium compound.

6 Claims, No Drawings

PROCESS FOR HYDROGENATING CONJUGATED DIENE POLYMER

FIELD OF THE INVENTION

This invention relates to a process for hydrogenating the double bond of a conjugated diene, which comprises contacting a conjugated diene polymer prepared by using an organic alkali metal compound as a polymerization initiator with hydrogen in an inert organic solvent.

BACKGROUND OF THE INVENTION

Polymers having an olefinically unsaturated double bond are advantageously used in vulcanization because of the unsaturated double bond, but the double bond also causes poor stability in resistance against heat or oxidation. The poor stability of these polymers can be markedly improved by hydrogenation to remove the unsaturated double bonds in the polymer chain. However, compared with low-molecular weight compounds, polymers are less susceptible to hydrogenation due to the influences of the viscosity of the reaction system, the steric hindrance of the polymer chain, etc. Moreover, after completion of hydrogenation, it is extremely difficult to physically remove the spent catalyst. Complete separation of the catalyst is practically impossible. Therefore, in order to achieve hydrogenation of polymers with economical advantages, it has been keenly demanded to develop a catalyst for hydrogenation which exhibits sufficient activity in such a low amount that it needs no removal, or a catalyst for hydrogenation which can be easily removed. In addition, if an alkali metal compound remains in a hydrogenated polymer in a high content, the weathering discoloration characteristic of the polymer is deteriorated.

The inventors of the present invention previously discovered a process for hydrogenating an olefin compound using a combination of a specific titanocene compound and an alkyl lithium (JP-A-61-33132 and JP-A-1-53851, the term "JP-A" as used herein means an "unexamined published Japanese patent application"), a process for hydrogenating an olefinically unsaturated (co)polymer by using a combination of a metallocene compound, an organoaluminum compound, zinc, and magnesium (JP-A-61-28507 and JP-A-62-209103), and a process for hydrogenating a living polymer containing an olefinically unsaturated group by using a combination of a specific titanocene compound and an alkyl lithium (JP-A-61-47706 and JP-A-63-5402). However, these catalyst systems, while being highly active, are difficult to handle and have unsatisfactory storage stability for a long period of time. Further, these systems require a reducing agent (organometal) to reduce a titanocene compound to a lower-valent compound, and the hydrogenation activity largely varies depending on the molar ratio of the reducing agent to the titanocene compound and on the contacting conditions, which also makes the catalyst system difficult to handle.

Hydrogenation of the double bond of an olefinically unsaturated double bond-containing polymer using a reaction product between a Tebbe's reagent (a metallacycle compound of a titanocene compound and trimethylaluminum) and an alkyl alkali metal compound is known (U.S. Pat. No. 5,244,980). In this process, it is disadvantageous that a large amount of an alkyl alkali metal compound is required as a cocatalyst to achieve high hydrogenation activity. In addition, because the catalyst used in this process has poor catalyst activity, a large amount of the catalyst is needed.

SUMMARY OF THE INVENTION

An object of the present invention is to provide an industrially advantageous process for hydrogenating the double bond of a conjugated diene polymer comprising contacting a conjugated diene polymer prepared by using an organic alkali metal compound as a polymerization initiator with hydrogen in an inert organic solvent, in which process the catalyst used for hydrogenation is stable and easy to handle, an alkali metal compound as a cocatalyst is not required, the amount of catalyst needed is very small, and the hydrogenation proceeds quantitatively with good reproducibility of results over a broad temperature range.

Other objects and effects of the present invention will become apparent from the following description.

The above objects of the present invention have been achieved by providing:

(1) a process for hydrogenating a conjugated diene polymer, which process comprises the steps of:
  deactivating a conjugated diene polymer which is prepared using an organic alkali metal compound as a polymerization initiator by adding a deactivator; and
  contacting the deactivated diene polymer with hydrogen in an inert hydrocarbon solvent to hydrogenate the double bond of the deactivated diene polymer,
  wherein the hydrogenation is carried out:
  (i) in the presence of a catalyst selected from organometallic compounds represented by the following formula:

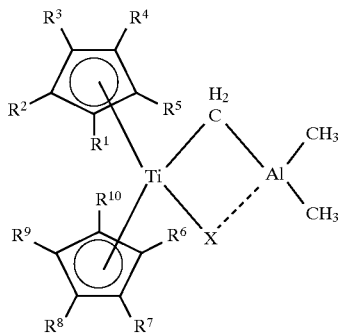

wherein $R^1$, $R^2$, $R^3$, $R^4$, $R^5$, $R^6$, $R^7$, $R^8$, $R^9$ and $R^{10}$, which may be the same or different, each represents a hydrogen atom, a hydrocarbon group having from 1 to 12 carbon atoms, or an alkylsilyl group having from 1 to 12 carbon atoms; and X represents a halogen atom or a methyl group; and
  (ii) under a condition satisfying the following relationship:

$-6<(M-Z+Al-Ti)/Ti<2$ wherein M represents the molar amount of the organic alkali metal compound; Z represents the molar amount of the deactivator; Al represents the molar amount of an organoaluminum compound; and Ti represents the molar amount of an organotitanium compound;

(2) the process according to the above described (1), wherein the inert hydrocarbon solvent is substantially free from a straight-chain ether compound;

(3) the process according to the above described (1), wherein the deactivator is added in an amount satisfying the relationship of $-5 \leq (M-Z)/Ti \leq 1.9$;

(4) the process according to the above described (1), wherein the hydrogenation is carried out under a condition satisfying the relationship of $-3 \leq (M-Z+Al-Ti)/Ti \leq 1$;

(5) the process according to the above described (1), wherein the catalyst is a reaction mixture of a titanocene dihalide and trimethylaluminum; and (6) the process according to the above described (1), wherein the hydrogenation is carried out in the presence of a tertiary amine compound.

The present inventors have found the following fact. When a conjugated diene prepared using an organic alkali metal compound as a polymerization initiator is brought into contact with hydrogen in an inert organic solvent to hydrogenate the double bond of the conjugated diene, hydrogenation of the olefinically unsaturated double bond of a conjugated diene polymer or a conjugated diene/vinyl aromatic hydrocarbon copolymer proceeds quantitatively without using an alkali metal compound by carrying out the reaction in the presence of a specific titanocene as component (A) under a specific condition that satisfies the relationship: $-6<(M-Z+Al-Ti)/Ti<2$. The inventors have surprisingly found that, as compared with the above-described system using a Tebbe's reagent and an organic alkali metal compound (cocatalyst), the quantitative hydrogenation can be achieved even when the catalyst is used in such an extremely small amount that requires no removal, and that, because the catalyst system exhibits hydrogenation activity in a broader range of temperature, a step of controlling the hydrogenation temperature is not necessary after polymerization. Thus, the hydrogenation can be effected in a high temperature region in which the reaction solution can have a low viscosity, thereby shortening the time of hydrogenation reaction. Further, control of a Ti to organic alkali metal compound ratio at the time of the hydrogenation by adding an organic alkali metal compound is unnecessary, and catalytic activity with extremely high reproducibility of results can be stably exhibited. The present invention has been achieved based on these findings. That is, the present invention has been completed based on the surprising facts that extremely high catalytic activity is obtained without addition of an additional organic alkali metal compound, that the catalyst has markedly improved heat resistance and high activity in a broad temperature range, and that the long-term stability of the catalytic activity can be markedly improved in the co-presence of a specific additive.

DETAILED DESCRIPTION OF THE INVENTION

The organic alkali metal compound for use in the present invention as a polymerization initiator includes those generally known as having anionic polymerization activity on conjugated diene compounds, such as aliphatic hydrocarbon alkali metal compounds, aromatic hydrocarbon alkali metal compounds and organic amino alkali metal compounds. The alkali metal includes lithium, sodium and potassium. Suitable organic alkali metal compounds include aliphatic or aromatic hydrocarbon lithium compounds having from 1 to 20 carbon atoms. These lithium compounds may be monolithium compounds having one lithium atom per single molecule and di-, tri- or tetralithium compounds having a plurality of lithium atoms per single molecule. Specific examples of the lithium compounds are n-propyl lithium, n-butyl lithium, sec-butyl lithium, tert-butyl. lithium, n-pentyl lithium, n-hexyl lithium, benzyl lithium, phenyl lithium, tolyl lithium, a reaction product of diisopropenylbenzene and sec-butyl lithium, and a reaction product of divinylbenzene, sec-butyl lithium and a small amount of 1,3-butadiene.

The conjugated diene polymer for use in the present invention includes homopolymers of a conjugated diene, copolymers of two or more conjugated dienes, and copolymers of a conjugated diene and a monomer(s) copolymerizable therewith, including 1,4-, 1,2- or 3,4-polymers having therein an olefin double bond originating from a conjugated diene monomer. The conjugated diene includes those having from 4 to 20 carbon atoms. Specific examples thereof include 1,3-butadiene, isoprene, 2,3-dimethyl-1,3-butadiene, 1,3-pentadiene, 2-methyl-1,3-pentadiene, 1,3-hexadiene, 4,5-diethyl-1,3-octadiene and 3-butyl-1,3-octadiene. 1,3-Butadiene and isoprene are preferred for industrial advantages and for obtaining elastic products having excellent physical properties. Other monomers copolymerizable with the conjugated dienes typically include vinyl aromatic compounds. Specific examples thereof include styrene, a-methylstyrene, p-methylstyrene, divinylbenzene, 1,1-diphenylethylene, N,N-dimethyl-p-aminoethylstyrene and N,N-diethyl-p-aminoethylstyrene. Of these, styrene and α-methylstyrene are preferred. The conjugated diene copolymers comprising these monomers may be random or block copolymers.

The inert hydrocarbon solvent for use in the present invention is a solvent for a conjugated diene polymer which does not adversely affect the hydrogenation reaction. In the present invention, it is preferable to conduct polymerization and subsequent hydrogenation in the same inert hydrocarbon solvent. Examples of suitable solvents include aliphatic hydrocarbons such as n-butane, isobutane, n-pentane, n-hexane, n-heptane and n-octane, and alicyclic hydrocarbons such as cyclohexane, cycloheptane and methylcycloheptane. Aromatic hydrocarbons such as benzene, toluene, xylene and ethylbenzene can be used only when the aromatic double-bond thereof is not hydrogenated under the hydrogenation condition to be used.

Catalyst component (A) is an organometallic compound represented by the following formula:

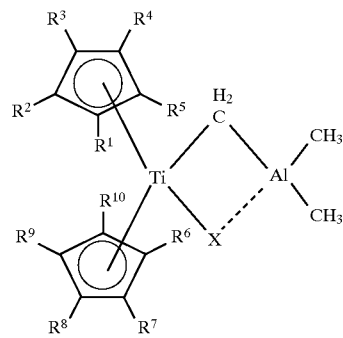

wherein $R^1$, $R^2$, $R^3$, $R^4$, $R^5$, $R^6$, $R^7$, $R^8$, $R^9$, and $R^{10}$, which may be the same or different, each represents a hydrogen atom, a hydrocarbon group having from 1 to 12 carbon atoms or an alkylsilyl group having from 1 to 12 carbon atoms; and X represents a halogen atom or a methyl group. Namely, component (A) includes a Tebbe's reagent and a Tebbe type complex, i.e., a metallacycle compound of a titanocene dihalide and trimethylaluminum, which is structurally analogous to a Tebbe's reagent.

The hydrocarbon group having from 1 to 12 carbon atoms as represented by $R^1$, $R^2$, $R^3$, $R^4$, $R^5$, $R^6$, $R^7$, $R^8$, $R^9$ and $R^{10}$ includes straight-chain hydrocarbon groups, branched hydrocarbon groups, alicyclic hydrocarbon groups and aromatic hydrocarbon groups. The alkylsilyl group as represented by $R^1$, $R^2$, $R^3$, $R^4$, $R^5$, $R^6$, $R^7$, $R^8$, $R^9$ and $R^{10}$ is represented by RR'R"Si— or —SiRR'—(wherein R, R' and R" each represent an alkyl group having from 1 to 12 carbon atoms). A ring may be formed of two groups selected from $R^1$, $R^2$, $R^3$, $R^4$ and $R^5$ or two groups selected from $R^6$, $R^7$, $R^8$, $R^9$ and $R^{10}$. Furthermore, one of $R^1$, $R^2$, $R^3$, $R^4$ and $R^5$ may be linked to one of $R^6$, $R^7$, $R^8$, $R^9$ and $R^{10}$. Specific examples of $R^1$, $R^2$, $R^3$, $R^4$, $R^5$, $R^6$, $R^7$, $R^8$, $R^9$ and $R^{10}$ include a hydrogen atom, and methyl, ethyl, propyl, isopropyl, n-butyl, isobutyl, t-butyl, sec-butyl, n-pentyl, isopentyl, 1-methylbutyl, 2-methylbutyl, 1,2-dimethylpropyl, neopentyl, n-hexyl, isohexyl, 1-methylpentyl, 2-methylpentyl, 3-methylpentyl, 1,1-dimethylbutyl, 2,2-dimethylbutyl, 3,3-dimethylbutyl, 1,2-dimethylbutyl, 1,3-dimethylbutyl, 1,1-ethylmethylpropyl, 1-ethylbutyl, 2-ethylbutyl, cyclohexyl, n-heptyl, isoheptyl, 4-methylhexyl, 3-methylhexyl, 2-methylhexyl, 1-methylhexyl, 1,1-dimethylpentyl, 2,2-dimethylpentyl, 3,3-dimethylpentyl, 4,4-dimethylpentyl, 1,2-dimethylpentyl, 1,3-dimethylpentyl, 1,4-dimethylpentyl, 1-ethylpentyl, 1-propylbutyl, 2-ethylpentyl, 3-ethylpentyl, 1,1-ethylmethylbutyl, 1,1-diethylpropyl, 2,3-dimethylpentyl, 2,4-dimethylpentyl, 3,4-dimethylpentyl, 1-ethyl-2-methylbutyl, 1-ethyl-3-methylbutyl, 4-methylcyclohexyl, 3-methylcyclohexyl, cycloheptyl, 1,1,2-trimethylbutyl, 1,1,3-trimethylbutyl, 2,2,1-trimethylbutyl, 2,2,3-trimethylbutyl, 3,3,1-trimethylbutyl, 3,3,2-trimethylbutyl, 1,1,2,2-tetramethylpropyl, tetramethylpropyl, n-octyl, 1-methylheptyl, 2-methylheptyl, 3-methylheptyl, 4-methylheptyl, 5-methylheptyl, isooctyl, 1-ethylhexyl, 2-ethylhexyl, 3-ethylhexyl, 4-ethylhexyl, 1,1-dimethylhexyl, 2,2-dimethylhexyl, 3,3-dimethylhexyl, 4,4-dimethylhexyl, 5,5-dimethylhexyl, 1,2-dimethylhexyl, 1,3-dimethylhexyl, 1,4-dimethylhexyl, 1,5-dimethylhexyl, 2,3-dimethylhexyl, 2,4-dimethylhexyl, 3,4-dimethylhexyl, 2,5-dimethylhexyl, 3,5-dimethylhexyl, 1, 1-methylethylpentyl, 1-ethyl-2-methylpentyl, 1-ethyl-3-methylpentyl, 1-ethyl-4-methylpentyl, 2-ethyl-1-methylpentyl, 2,2-ethylmethylpentyl, 3,3-ethylmethylpentyl, 2-ethyl-3-methylpentyl, 2-ethyl-4-methylpentyl, 3-ethyl-4-methylpentyl, 3-ethyl-2-methylpentyl, 1,1-diethylbutyl, 2,2-diethylbutyl, 1,2-diethylbutyl, 1,1-methylpropylbutyl, 2-methyl-1-propylbutyl, 3-methyl-1-propylbutyl, 4-ethylcyclohexyl, 3-ethylcyclohexyl, 3,4-dimethylcyclohexyl, 1,1,2-trimethylpentyl, 1,1,3-trimethylpentyl, 1,1,4-trimethylpentyl, 2,2,1-trimethylpentyl, 2,2,3-trimethylpentyl, 2,2,4-trimethylpentyl, 3,3,1-trimethylpentyl, 3,3,2-trimethylpentyl, 3,3,4-trimethylpentyl, 1,2,3-trimethylpentyl, 1,2,4-trimethylpentyl, 1,3,4-trimethylpentyl, 1,2,3-trimethylpentyl, 1,2,4-trimethylpentyl, 1,3,4-trimethylpentyl, 1,1,2,2-tetramethylbutyl, 1,1,3,3-tetramethylbutyl, 1,1,2,3-tetramethylbutyl, 2,2,1,3-tetramethylbutyl, 1-ethyl-1,2-dimethylbutyl, 2-ethyl-1,2-dimethylbutyl, 1-ethyl-2,3-dimethylbutyl, n-nonyl, isononyl, 1-methyloctyl, 2-methyloctyl, 3-methyloctyl, 4-methyloctyl, 5-methyloctyl, 6-methyloctyl, 1-ethylheptyl, 2-ethylheptyl, 3-ethylheptyl, 4-ethylheptyl, 5-ethylheptyl, 1,1-dimethylheptyl, 2,2-dimethylheptyl, 3,3-dimethylheptyl, 4,4-dimethylheptyl, 5,5-dimethylheptyl, 6,6-dimethylheptyl, 1,2-dimethylheptyl, 1,3-dimethylheptyl, 1,4-dimethylheptyl, 1,5-dimethylheptyl, 1,6-dimethylheptyl, 2,3-dimethylheptyl, 2,4-dimethylheptyl, 2,5-dimethylheptyl, 2,6-dimethylheptyl, 3,4-dimethylheptyl, 3,5-dimethylheptyl, 3,6-dimethylheptyl, 4,5-dimethylheptyl, 4,6-dimethylheptyl, 5,6-dimethylheptyl, 1,1,2-trimethylhexyl, 1,1,3-trimethylhexyl, 1,1,4-trimethylhexyl, 1,1,5-trimethylhexyl, 2,2,1-trimethylhexyl, 2,2,3-trimethylhexyl, 2,2,4-trimethylhexyl, 2,2,5-trimethylhexyl, 3,3,1-trimethylhexyl, 3,3,2-trimethylhexyl, 3,3,4-trimethylhexyl, 3,3,5-trimethylhexyl, 4,4,1-trimethylhexyl, 4,4,2-trimethylhexyl, 4,4,3-trimethylhexyl, 4,4,5-trimethylhexyl, 5,5,1-trimethylhexyl, 5,5,2-trimethylhexyl, 5,5,3-trimethylhexyl, 5,5,4-trimethylhexyl, 1,2,3-trimethylhexyl, 2,3,4-trimethylhexyl, 3,4,5-trimethylhexyl, 1,3,4-trimethylhexyl, 1,4,5-trimethylhexyl, 2,4,5-trimethylhexyl, 1,2,5-trimethylhexyl, 1,2,4-trimethylhexyl, 1,1-ethylmethylhexyl, 2,2-ethylmethylhexyl, 3,3-ethylmethylhexyl, 4,4-ethylmethylhexyl, 5,5-ethylmethylhexyl, 1-ethyl-2-methylhexyl, 1-ethyl-3-methylhexyl, 1-ethyl-4-methylhexyl, 1-ethyl-5-methylhexyl, 2-ethyl-1-methylhexyl, 3-ethyl-1-methylhexyl, 3-ethyl-2-methylhexyl, 1,1-diethylpentyl, 2,2-diethylpentyl, 3,3-diethylpentyl, 1,2-diethylpentyl, 1,3-diethylpentyl, 2,3-diethylpentyl, 1,1-methylpropylpentyl, 2,2-methylpropylpentyl, 1-methyl-2-propylpentyl, n-decyl, isodecyl, 1-methylnonyl, 2-methylnonyl, 3-methylnonyl, 4-methylnonyl, 5-methylnonyl, 6-methylnonyl, 7-methylnonyl, 1-ethyloctyl, 2-ethyloctyl, 3-ethyloctyl, 4-ethyloctyl, 5-ethyloctyl, 6-ethyloctyl, 1,1-dimethyloctyl, 2,2-dimethyloctyl, 3,3-dimethyloctyl, 4,4-dimethyloctyl, 5,5-dimethyloctyl, 6,6-dimethyloctyl, 7,7-dimethyloctyl, 1,2-dimethyloctyl, 1,3-dimethyloctyl, 1,4-dimethyloctyl, 1,5-dimethyloctyl, 1,6-dimethyloctyl, 1,7-dimethyloctyl, 2,3-dimethyloctyl, 2,4-dimethyloctyl, 2,5-dimethyloctyl, 2,6-dimethyloctyl, 2,7-dimethyloctyl, 3,4-dimethyloctyl, 3,5-dimethyloctyl, 3,6-dimethyloctyl, 3,7-dimethyloctyl, 4,5-dimethyloctyl, 4,6-dimethyloctyl, 4,7-dimethyloctyl, 5,6-dimethyloctyl, 5,7-dimethyloctyl, n-undecyl, n-dodecyl, trimethylsilyl, triethylsilyl, tributylsilyl, trioctylsilyl and methyldibutylsilyl groups. Examples of the ring and the linking group formed by these substituents include fluorenyl, indenyl, tetrahydroindenyl, methylene, ethylene, —C(CH$_3$)$_2$—, —C(C$_2$H$_5$)$_2$—, —Si(CH$_3$)$_2$— and —Si (C$_2$H$_5$)$_2$— groups. These groups may be used alone or in a combination of two or more thereof. The groups are not limited to the above-enumerated examples. The number of the substituents (hydrocarbon groups and/or alkylsilyl groups) of the cyclopentadienyl compound is, although not specifically limited, preferably from 0 to 4. For obtaining high hydrogenation activity on the unsaturated double bond of the conjugated diene moiety of the conjugated diene polymer or the conjugated diene/vinyl aromatic hydrocarbon copolymer and for securing selectivity in terms of the hydrogenation site in a broad temperature range, $R^1$, $R^2$, $R^3$, $R^4$, $R^5$, $R^6$, $R^7$, $R^8$, $R^9$ and $R^{10}$ are each preferably selected from a hydrogen atom, and methyl, ethyl, propyl, isopropyl, n-butyl, isobutyl, t-butyl, sec-butyl, n-pentyl, isopentyl, 1-methylbutyl, 2-methylbutyl, 1,2-dimethylpropyl, neopentyl, n-hexyl, isohexyl, 1-methylpentyl, 2-methylpentyl, 3-methylpentyl, 1,1-dimethylbutyl, 2,2-dimethylbutyl, 3,3-dimethylbutyl, 1,2-dimethylbutyl, 1,3-dimethylbutyl, 1,1-ethylmethylpropyl, 1-ethylbutyl, 2-ethylbutyl, cyclohexyl, n-heptyl, isoheptyl, 4-methylhexyl, 3-methylhexyl, 2-methylhexyl, 1-methylhexyl, 1,1-dimethylpentyl, 2,2,-dimethylpentyl, 3,3-dimethylpentyl, 4,4-dimethylpentyl, 1,2-dimethylpentyl, 1,3-dimethylpentyl, 1,4-dimethylpentyl, 1-ethylpentyl, 1-propylbutyl, 2-ethylpentyl, 3-ethylpentyl, 1,1-ethylmethylbutyl, 1,1-diethylpropyl, 2,3-dimethylpentyl, 2,4-dimethylpentyl, 3,4-dimethylpentyl, 1-ethyl-2-methylbutyl, 1-ethyl-3-methylbutyl, 4-methylcyclohexyl, 3-methylcyclohexyl, cycloheptyl, 1,1,2-trimethylbutyl, 1,1,3-trimethylbutyl, 2,2,1-trimethylbutyl, 2,2,3-trimethylbutyl, 3,3,1-trimethylbutyl, 3,3,2- trimethylbutyl, 1,1,2,2-tetramethylpropyl and n-octyl groups. Particularly preferred for activity are a hydrogen atom, and methyl, ethyl, propyl, isopropyl, n-butyl, isobutyl, t-butyl, sec-butyl, n-pentyl, isopentyl, 1-methylbutyl, 2-methylbutyl, 1,2-dimethylpropyl, neopentyl, n-hexyl, isohexyl, 1-methylpentyl, 2-methylpentyl, 3-methylpentyl, 1,1-dimethylbutyl, 2,2-dimethylbutyl, 3,3-dimethylbutyl, 1,2-dimethylbutyl, 1,3-dimethylbutyl, 1,1-ethylmethylpropyl, 1-ethylbutyl, 2-ethylbutyl, cyclohexyl and n-heptyl groups.

Component (A) is typically prepared by reacting a dihalide compound of a corresponding titanocene and trimethylaluminum. Component (A) may be used either as isolated from the reaction mixture or in the form of the reaction mixture as produced. Use of the reaction mixture as is can be industrially advantageous. Mixing of a titanocene dihalide and trimethylaluminum alone does not result in formation of component (A). They must be reacted thoroughly. Specifically, a titanocene dihalide is dispersed or dissolved in an inert solvent, and trimethylaluminum is added thereto, followed by thorough stirring at 0° to 100° C. At too low a reaction temperature, it takes too much time to produce component (A). At too high a temperature, a side reaction is apt to occur, and the resulting component (A) has reduced hydrogenation activity. A preferred reaction temperature ranges from 10° to 50° C. The reaction proceeds through two stages, and in the beginning stage component (A) is not formed at all. The reaction time is preferably one day or longer at room temperature. Therefore, it is important to confirm formation of component (A) by, for example, NMR analysis. Formation of the complex is preferably confirmed by the technique reported by Tebbe et al. (*J. Am. Chem. Soc.*, Vol. 100, pp. 3611–3613 (1978)). It is known that, in the $^1$H-NMR spectrum of component (A), the proton absorption ascribed to the methylene crosslink characteristic of a Ti-Al metallacycle peculiarly appears in a lower magnetic field (7.8 to 8.3 ppm) than the proton absorption of a general Ti complex or Al compound. Comparison between this peak and the peaks of other by-products allows confirmation of the formation of component (A) and calculation of the production ratio.

In carrying out hydrogenation of the conjugated diene polymer by contact with hydrogen in an inert hydrocarbon solvent, it is necessary that (M−Z+Al−Ti)/Ti (wherein M represents the molar amount of the organic alkali metal compound; Z represents the molar amount of the deactivator; Al represents the molar amount of an organoaluminum compound; and Ti represents the molar amount of an organotitanium compound) be from more than −6 to less than 2. It is preferable that (M−Z+Al−Ti)/Ti be from −3 to 1. If the above parameter does not fall within the above range, component (A) fails to produce the excellent effect of high hydrogenation activity with the use of a small addition amount thereof.

M, the molar amount of an organic alkali metal compound, is the molar amount of the alkali metal contained in the organic alkali metal compound for use in the production of a conjugated diene polymer as a polymerization initiator.

The deactivator is a compound which serves to deactivate the organometallic compound. In the present invention, the deactivator is a compound capable of deactivating the organic alkali metal compound for use in the production of a conjugated diene polymer as a polymerization initiator and deactivating the organoaluminum compound for use in the synthesis of component (A). Z, the molar amount of the deactivator, corresponds to the molar amount in case of a monovalent deactivator, or to the product of the molar amount and the valence in case of a polyvalent deactivator.

Al, the molar amount of the organoaluminum compound, is the molar amount of the organoaluminum compound added to the hydrogenation system. It is the total molar amount of aluminum incorporated into component (A), the unreacted organoaluminum compound used for the synthesis of component (A), and the aluminum of an organoaluminum compound produced during the synthesis.

Ti, the molar amount of the organotitanium compound, is the molar amount of the organotitanium compound added to the hydrogenation system. It is the total molar amount of titanium incorporated into component (A), the unreacted organotitanium compound used for the synthesis of component (A), and the titanium of an organotitanium compound produced during the synthesis.

The deactivator preferably includes compounds having a hydroxyl group, a carbonyl group, an ester group, an epoxy group, etc. which react with an organometallic compound to produce a metal alkoxide and halogen compounds which react with an organometallic compound to produce a metal halide. Ester compounds, polyepoxy compounds and polyhalogen compounds may be utilized depending on the intended purpose to be reacted with an alkali metal terminal of the conjugated diene polymer, to thereby increase the molecular weight or to form a branched structure. Examples of suitable deactivators are alcohols such as methanol, ethanol, n-propanol, n-butanol, sec-butanol, t-butanol, 1-pentanol, 2-pentanol, 3-pentanol, 1-hexanol, 2-hexanol, 3-hexanol, 1-heptanol, 1-hexanol, 2-hexanol, 3-hexanol, 1-heptanol, 2-heptanol, 3-heptanol, 4-heptanol, octanol, nonanol, decanol, undecanol, lauryl alcohol, allyl alcohol, cyclohexanol, cyclopentanol and benzyl alcohol; phenols such as phenol, o-cresol, m-cresol, p-cresol, p-allylphenol, 2,6-di-t-butyl-p-cresol and xylenol; organic carboxylic acids such as acetic acid, propionic acid, butyric acid, isoacetic acid, pentanoic acid, hexanoic acid, heptanoic acid, decalic acid, myristic acid, stearic acid, behenic acid and benzoic acid; carbonyl compounds such as acetaldehyde, acetone, methyl ethyl ketone, diisopropyl ketone, acetylacetone, benzaldehyde, diphenyl ketone and acetylbenzene; and esters such as ethyl acetate, butyl propionate, diethyl adipate, methyl benzoate, dimethyl terephthalate and trimethyl pyromellitate. Water or carbonic acid gas is also useful as a deactivator provided that the molar ratio thereof is industrially controllable. Examples of halogen-containing deactivators include halogenated hydrocarbons such as benzyl chloride, methyl chloride, methyl bromide, ethyl chloride, ethyl bromide, propyl chloride, propyl bromide, n-butyl chloride, n-butyl bromide and dibromoethane; halogenated silicon compounds represented by the formula: $R_{4-n}SiX_n$ (wherein R represents a hydrocarbon group having from 1 to 20 carbon atoms; X represents a halogen atom; and n represents an integer of from 1 to 4) such as trimethylsilyl chloride, trimethylsilyl bromide, diethylsilyl dichloride, methylsilyl trichloride, t-butylsilyl chloride and tetrachlorosilane; and halogenated tin compounds represented by the formula: $R_{4-n}SnX_n$ (wherein R represents a hydrocarbon group having from 1 to 20 carbon atoms; X represents a halogen atom; and n represents an integer of from 1 to 4) such as trimethyltin chloride, trimethyltin bromide, tributyltin chloride, diethyltin dichloride, methyltin trichloride, t-butyltin trichloride and tin tetrachloride. These deactivators can be used either alone or in a combination of two or more thereof.

A primary amine, a secondary amine, molecular hydrogen, an acetylene compound, an allene compound, etc.

is also capable of deactivating the organic alkali metal compound when added to the polymerization system. However, because they may cause an unfavorable side reaction with a titanocene, they are preferably used in combination with the above-enumerated deactivators. In this case, the molar amount of only the above-enumerated deactivator is taken as "Z".

In the present invention, it is preferable that the deactivator be added in an amount satisfying the relationship: $-5 \leq (M-Z)/Ti \leq 1.9$ to the conjugated diene polymer obtained by using an organic alkali metal compound as a polymerization initiator. Under this condition, the characteristic effect of the present invention that high hydrogenation activity is exerted with a small amount of a hydrogenation catalyst is particularly noticeable.

It is industrially advantageous to use the reaction mixture of a titanocene dihalide and trimethylaluminum as it is, as component (A), because industrially available compounds are used as starting materials. In this case, it is desirable for component (A) to be produced in a yield of 20% or higher, particularly 50% or higher, as calculated on the basis of titanium in the titanocene dihalide.

Where the reaction mixture of a titanocene dihalide and trimethylaluminum is used as it is, as component (A), the deactivator may also be added to the reaction mixture. In this case, it is preferable that the deactivator be added in an amount satisfying the relationship: $-1 \leq (Al-Ti-Z)/Ti \leq 5$ in the reaction mixture, and then the mixture is added to the polymer solution to conduct hydrogenation. It is more preferred to add the deactivator in an amount satisfying the relationship: $-0.5 \leq (Al-Ti-Z)/Ti \leq 2$. Under this condition, particularly high hydrogenation activity, which is the characteristic effect of the present invention, lasts over a long time of period giving a great industrial advantage.

Hydrogenation should be carried out in an inert hydrocarbon solvent that is substantially free from a straight-chain ether compound. The straight-chain ether compound includes dialkyl ethers and dialkyl ethylene glycols, such as dimethyl ether, diethyl ether, di-n-propyl ether, di-isopropyl ether, di-n-butyl ether, ethylene glycol dimethyl ether, ethylene glycol diethyl ether and ethylene glycol dibutyl ether. The presence of such a straight-chain ether compound in the hydrogenation system causes reduction of the hydrogenation activity of the catalyst, resulting in a failure of attaining a high degree of hydrogenation with a small amount of the hydrogenation catalyst. The language "substantially free from" as used herein means that the amount of the straight-chain ether compound, if any, is small to the extent that the effect thereof does not appear. The activity of the hydrogenation catalyst is generally reduced in the presence of 0.1 mol or more of a straight-chain ether compound per mole of the organotitanium component of the catalyst.

The effect of the present invention that high hydrogenation activity is obtained with a small amount of the catalyst component can be further enhanced by conducting the hydrogenation in the presence of a tertiary amine compound.

The tertiary amine which can be used in the present invention is represented by the formula: $R^{11}R^{12}R^{13}N$ (wherein $R^{11}$, $R^{12}$ and $R^{13}$ each represent a hydrocarbon group having from 1 to 20 carbon atoms which may contain a tertiary amino group). Examples of such a tertiary amine include trimethylamine, triethylamine, tributylamine, N,N-dimethylaniline, N-ethylpiperidine, N-methylpyrrolidine, N,N,N',N'-tetramethylethylenediamine, N,N,N',N'-tetraethylethylenediamine, 1,2-dipiperidinoethane, trimethylaminoethylpiperazine, N,N,N',N",N"-pentamethylethylenetriamine and N,N'-dioctyl-p-phenylenediamine. A tertiary amine which is added to the polymerization system for vinylation of the conjugated diene is also taken into account.

The tertiary amine compound is preferably present in an amount of 0.0005 to 200 mol, particularly 0.1 to 70 mol, per mole of titanium.

In homopolymerizing a conjugated diene or copolymerizing a conjugated diene and a copolymerizable monomer(s) by using an organic alkali metal compound as a polymerization initiator, a tertiary amine compound or an ether compound can be added to the system for increasing the vinyl structure (1,2-bond or 3,4-bond) of the conjugated diene. Of these, a tertiary amine compound is preferred. Examples of the tertiary amine compound to be added here are the same as those enumerated above. Straight-chain ether compounds are excluded from the ether compounds to be added because of the adverse influence on hydrogenation as described above. Examples of suitable ether compounds include cyclic ethers such as tetrahydrofuran, 2,5-dimethyloxolane, 2,2,5,5-tetramethyloxolane and 2,2-bis(2-oxolanyl)propane.

The homo- or copolymerization of the conjugated diene in the presence of the organic alkali metal compound can be performed either batch-wise or continuously.

Of hydrogenated conjugated diene polymers which can be obtained in the present invention, particularly significant in an industrial aspect are hydrogenated block copolymers comprising a conjugated diene polymer block (D) and a vinyl aromatic polymer block (S), especially (D-S) diblock copolymers, (S-D-S) terblock copolymers, (D-S-D-S) tetrablock copolymers, (D-S-D-S-D) pentablock copolymers, $(c)-(D-S)_n$, radial block copolymers (wherein c is a coupling agent residue; and n is an integer of from 3 to 8), and mixtures thereof, with the double bond in the conjugated diene block(s) thereof being hydrogenated. More specifically, hydrogenated block copolymers comprising a styrene polymer block(s) and a butadiene polymer block(s) with the double bond of the butadiene polymer block(s) being hydrogenated are of extreme importance as a thermoplastic elastomer for use as a raw material rubber, resin modifier or tackifier of rubbery compounds.

The hydrogenation reaction is generally conducted with molecular hydrogen, which is preferably introduced in a gas state into a solution of the conjugated diene polymer. The hydrogenation is preferably carried out with stirring to contact introduced hydrogen with the polymer sufficiently rapidly. The reaction may be either a batch reaction or a continuous reaction.

It is sufficient to add Component (A) in an amount of 0.001 to 5 mmol per 100 g of the conjugated diene polymer. This amount suffices for sufficient hydrogenation of the double bond of the conjugated diene polymer while causing substantially no hydrogenation of the double bond of the aromatic ring in the copolymer, to thereby realize extremely high hydrogenation selectivity. The hydrogenation can be effected with amounts exceeding 20 mmol as well, but this is not preferred because the use in an excess amount is uneconomical and makes catalyst removal after the reaction complicated. A preferred amount of the catalyst is 0.002 to 1 mmol, particularly 0.005 to 0.2 mmol, per 100 g of the polymer.

Component (A) may be added all at once before the commencement of the hydrogenation or may be divided in two or more portions. In the latter case, a portion is added before the commencement of the reaction, and the rest is added during the reaction either continuously or intermittently. In a preferred mode of addition, a 5 to 99% by weight portion is added before the start of the reaction, and the rest is added either in divided portions or continuously while the degree of hydrogenation ranges from 30 to 95% based on the finally reached degree. According to this mode, the necessary amount of component (A) can be reduced as compared with the case where the whole amount is added prior to the reaction.

The hydrogenation reaction is usually carried out at a temperature ranging from 0° to 200° C. If the temperature is below 0° C., the reaction rate is low and an increased amount of component (A) is required. Thus, this is uneconomical. At temperatures above 200° C., the reaction system tends to suffer side reactions, decomposition or gelation, and the catalyst is inactivated to thereby reduce hydrogenation activity. A preferred temperature is from 20° to 180° C.

A preferred hydrogen pressure for hydrogenation is 0.1 to 10 MPa. Under a hydrogen pressure less than 0.1 MPa, the reaction rate is too low to practically increase the degree of hydrogenation. If the pressure exceeds 10 MPa, the hydrogenation is almost complete upon elevating the pressure, which is practically meaningless and provokes unnecessary side reactions. A more preferred hydrogen pressure is 0.2 to 3 MPa. The optimum hydrogen pressure is decided in relation to the amount of the catalyst, and the like. In practice, as the amount of the catalyst decreases within the above-described suitable range, it is preferable to select the higher hydrogen pressure. The reaction time is usually from several seconds to 50 hours. The time and pressure are appropriately selected from the above ranges in accordance with the desired degree of hydrogenation.

According to the process of the invention, the double bond of the conjugated diene polymer or conjugated diene/vinyl aromatic hydrocarbon copolymer can be hydrogenated to an arbitrary degree depending on the intended purpose. If necessary, a degree of hydrogenation as high as 95% or more, or even 98% or more can be reached stably. The attained degree of hydrogenation can be easily measured by $^1$H-NMR analysis.

It is possible to stop the hydrogenation reaction when an arbitrary degree of hydrogenation is reached, e.g., when 3 to 95% of the total double bonds in the conjugated diene block are hydrogenated. This can be achieved by, for example, controlling the hydrogen feed or deactivating the catalyst when a prescribed degree of hydrogenation is reached.

If desired, the catalyst residue can be removed from the polymer solution after hydrogenation, and the hydrogenated polymer can be separated from the solution. For example, the polymer can be separated by adding a polar solvent, which is a poor solvent for the hydrogenated polymer, such as acetone or an alcohol, to the reaction solution to precipitate the polymer; pouring the reaction solution into hot water while stirring, and distilling the polymer together with the solvent; or directly heating the reaction solution to evaporate the solvent.

The hydrogenation process of the invention is primarily characterized in that the catalyst is used in a reduced amount, and any cocatalyst is not needed. Therefore, the catalyst does not adversely influence the physical properties of the hydrogenated polymer even though it remains in the hydrogenated polymer. In addition, most of the catalyst is decomposed and separated from the hydrogenated polymer in the course of isolating the polymer. As a result, any special operation for ashing or removing the catalyst is not particularly required. Further, because an organic alkali metal cocatalyst is not used, optimization of the catalyst composition is not necessary. As a result, the hydrogenation can be accomplished through a very simple process with good reproducibility of results. The secondary characteristic of the process of the invention is that the catalyst exhibits high hydrogenation activity on olefin compounds in a broad range of temperature because it has excellent heat resistance and hardly shows a reduction in rate of hydrogenation even at a relatively low temperature.

The present invention will be described in greater detail below with reference to the following Examples, but the invention should not be construed as being limited thereto.

EXAMPLE 1

In a 5 l jacketed autoclave equipped with a stirrer were charged 1667 g of cyclohexane, 12.1 mmol of sec-butyl lithium, and 4.5 mmol of N,N,N',N'-tetramethylethylenediamine, and 250 g of a 30 wt % cyclohexane solution of styrene was added thereto. Polymerization was carried out at 75° C. To the reaction system, a 30 wt % cyclohexane solution of 1167 g of 1,3-butadiene and 250 g of a 30 wt % cyclohexane solution of styrene were added thereto, and polymerization was continued to obtain an SBS (styrene-butadiene-styrene) terblock copolymer. Two percent of the sec-butyl lithium was deactivated with a trace water content, leaving 11.9 mmol of active lithium. To the resulting living polymer solution was added 12.37 mmol of ethanol to deactivate the polymer terminals.

Separately, a cyclohexane solution of 0.94 mmol of titanocene dichloride (produced by Wako Pure Chemical Industries, Ltd.) and 1.88 mmol of trimethylaluminum was stirred at room temperature for 100 hours. A half portion of the product was taken out and evaporated to remove the volatile matter. The residue was dissolved in a deutero benzene solution and analyzed by $^1$H-NMR. The peak at 7.15 ppm attributed to deutero benzene being taken as a reference peak, each peak was compared with the $^1$H-NMR spectrum of a Tebbe type complex in the literature (*J. Am. Chem. Soc.*, Vol. 100, pp. 3611–3613 (1978)) to confirm the agreement. The peak attributed to $(Cp)_2TiClMe$ was also confirmed. It was revealed from the peak ratio that the molar ratio of the Tebbe type complex and $(Cp)_2TiClMe$ was 7:3.

The other half of the reaction product was added to the above prepared SBS polymer solution, and hydrogen was blown therein to give a partial pressure of 0.7 MPa, under which hydrogenation was conducted at 80° C. After 30 minutes, the degree of hydrogenation reached 99%.

M was 11.9 mmol, Z 12.37 mmol, Al 0.94 mmol and Ti 0.47 mmol, respectively, giving 0 for (M−Z+Al−Ti)/Ti and −1 for (M−Z)/Ti.

EXAMPLE 2

In the same manner as in Example 1, a living polymer solution of an SBS terblock copolymer was prepared using an organic alkali metal compound as a polymerization initiator, and 13.78 mmol of ethanol was added thereto to deactivate the polymer terminals.

Separately, a cyclohexane solution of 0.94 mmol of titanocene dichloride (produced by Wako Pure Chemical Industries, Ltd.) and 2.82 mmol of trimethylaluminum was stirred at room temperature for 72 hours. A half portion of the product was taken out and evaporated to remove the volatile matter. The residue was dissolved in a deutero benzene solution and analyzed by $^1$H-NMR. The peak at 7.15 ppm attributed to deutero benzene being taken as a reference peak, each peak was compared with the $^1$H-NMR spectrum of a Tebbe type complex in the literature (*J. Am. Chem. Soc.*, Vol. 100, pp. 3611–3613 (1978)) to confirm the agreement. The peak attributed to $(Cp)_2TiClMe$ was also confirmed. It was revealed from the peak ratios that the molar ratio of the Tebbe type complex and $(Cp)_2TiClMe$ was 6:4.

The other half of the reaction product was added to the above prepared SBS polymer solution, and hydrogen was blown therein to a partial pressure of 0.7 MPa, under which hydrogenation was conducted at 80° C. After 30 minutes, the degree of hydrogenation reached 96%.

M was 11.9 mmol, Z 13.78 mmol, Al 1.41 mmol and Ti 0.47 mmol, respectively, giving −2 for (M−Z+Al−Ti)/Ti and −4 for (M−Z)/Ti.

EXAMPLE 3

In the same manner as in Example 1, a living polymer solution of an SBS terblock copolymer was prepared using an organic alkali metal compound as a polymerization initiator, and 11.66 mmol of trimethylsilyl chloride was added thereto to deactivate most of the polymer terminals.

Separately, a cyclohexane solution of 0.94 mmol of titanocene dichloride (produced by Wako Pure Chemical Industries, Ltd.) and 1.41 mmol of trimethylaluminum was stirred at room temperature for 100 hours. A half portion of the product was taken out and evaporated to remove the volatile matter. The residue was dissolved in a deutero benzene solution and analyzed by $^1$H-NMR. The peak at 7.15 ppm attributed to deutero benzene being taken as a reference peak, each peak was compared with the $^1$H-NMR spectrum of a Tebbe type complex in the literature (*J. Am. Chem. Soc.*, Vol. 100, pp. 3611–3613 (1978)) to confirm the agreement. The peak attributed to $(Cp)_2TiClMe$ was also confirmed. It was revealed from the peak ratios that the molar ratio of the Tebbe type complex and $(Cp)_2TiClMe$ was 7:3.

The other half of the reaction product was added to the above prepared SBS polymer solution, and hydrogen was blown therein to a partial pressure of 0.7 MPa, under which hydrogenation was conducted at 80° C. After 30 minutes, the degree of hydrogenation reached 95%.

M was 11.9 mmol, Z 11.66 mmol, Al 0.705 mmol and Ti 0.47 mmol, respectively, giving 1 for (M−Z+Al−Ti)/Ti and 0.5 for (M−Z)/Ti.

EXAMPLE 4

In the same manner as in Example 1, a living polymer solution of an SBS terblock copolymer was prepared using an organic alkali metal compound as a polymerization initiator, and 11.9 mmol of trimethylsilyl chloride was added thereto to deactivate the polymer terminals.

Separately, a toluene solution of 0.1 mol of titanocene dichloride (produced by Wako Pure Chemical Industries, Ltd.) and 0.2 mol of trimethylaluminum was stirred at room temperature for 60 hours. The reaction mixture was evaporated to remove the volatile matter, and the residue was recrystallized from toluene to yield 14 g of the product. The product was again recrystallized from toluene and pentane containing trimethylaluminum to give 9.5 g of reddish orange crystals. The crystals were dissolved in a deutero benzene solution and analyzed by $^1$H-NMR. The peak at 7.15 ppm attributed to deutero benzene being taken as a reference peak, each peak was compared with the $^1$H-NMR spectrum of a Tebbe type complex in the literature (*J. Am. Chem. Soc.*, Vol. 100, pp. 3611–3613 (1978)) to confirm the agreement. It was also confirmed that there was no impurity.

A cyclohexane solution of the crystals (0.20 mmol) was added to the above prepared SBS polymer solution, and hydrogen was blown therein to a partial pressure of 1.2 MPa, under which hydrogenation was conducted at 100° C. When the degree of hydrogenation reached 80%, a cyclohexane solution of 0.11 mmol of the crystals was further added thereto, and the hydrogenation reaction was continued. After 30 minutes, the degree of hydrogenation reached 99%.

M was 11.9 mmol, Z 11.9 mmol, Al (Al in the Tebbe's complex) 0.31 mmol and Ti 0.31 mmol, respectively, giving 0 for (M−Z+Al−Ti)/Ti and 0 for (M−Z)/Ti.

EXAMPLE 5

In a 5 l jacketed autoclave equipped with a stirrer were charged 1667 g of cyclohexane, 19.5 mmol of n-butyl lithium, and 5.8 mmol of N,N,N',N'-tetramethylethylenediamine, and 250 g of a 30 wt % cyclohexane solution of styrene was added thereto. Polymerization was carried out at 75° C. To the reaction system was added a 30 wt % cyclohexane solution of 1417 g of 1,3-butadiene, and polymerization was continued to obtain an SB (styrene-butadiene) diblock copolymer. One percent of the n-butyl lithium was deactivated with a trace water content, leaving 19.3 mmol of active lithium. To the resulting living polymer solution was added 2.90 mmol of tin tetrachloride to cause coupling to form an Sn-(D-S)$_n$, radial block polymer. To the reaction mixture was added 7.7 mmol of methanol to deactivate the polymer terminals.

To the above prepared SB polymer solution was added a cyclohexane solution of 0.50 mmol of the same Tebbe type complex as obtained in Example 4, and hydrogen was blown therein to a partial pressure of 0.7 MPa, under which hydrogenation was conducted at 80° C. After 30 minutes, the degree of hydrogenation reached 98%.

M was 19.3 mmol, Z 2.9×4+7.7=19.3 mmol, Al (Al in the Tebbe's complex) 0.50 mmol, and Ti 0.50 mmol, respectively, giving 0 for (M−Z+Al−Ti)/Ti and 0 for (M−Z)/Ti.

EXAMPLE 6

A cyclohexane solution of 0.94 mmol of titanocene dichloride and 1.88 mmol of trimethylaluminum was stirred at room temperature for 100 hours in the same manner as in Example 1. A half portion of the reaction product was analyzed by $^1$H-NMR to confirm formation of a Tebbe type complex. To the other half was added 0.24 mmol of ethanol, and the product was preserved at 25° C. for 30 days.

In the same manner as in Example 1, a living polymer solution of an SBS terblock copolymer was prepared using an organic alkali metal compound as a polymerization initiator, and 11.9 mmol of ethanol was added thereto to deactivate the polymer terminals. The preserved reaction product containing the Tebbe type complex was added to the SBS polymer solution, and hydrogen was blown therein to a partial pressure of 0.7 MPa, under which hydrogenation was conducted at 80° C. After 30 minutes, the degree of hydrogenation reached 99%.

M was 11.9 mmol, Z 11.9+0.24=12.14 mmol, Al 0.94 mmol, and Ti 0.47 mmol, respectively, giving 0.5 for (M−Z+Al−Ti)/Ti.

EXAMPLE 7

In the same manner as in Example 1, a living polymer solution of an SBS terblock copolymer was prepared using an organic alkali metal compound as a polymerization initiator, and 11.9 mmol of ethanol was added thereto to deactivate the polymer terminals.

Separately, 0.1 mol of bis(methylcyclopentadienyl)-titanium dichloride (produced by Nippon Fine Chemical Co. Ltd.) and a hexane solution of 0.3 mol of trimethylaluminum were mixed and stirred at room temperature for 70 hours. The reaction mixture was evaporated to remove the volatile matter, and the residue was recrystallized. The crystals were analyzed by $^1$H-NMR in the same manner as for the Tebbe's reagent of Example 4. The peak at 7.15 ppm attributed to deutero benzene being taken as a reference peak, each peak was compared with the $^1$H-NMR spectrum of a Tebbe type complex in the literature (*J. Am. Chem. Soc.*, Vol. 100, pp. 3611–3613 (1978)). As a result, the peak of a methylene crosslink peculiar to a Tebbe type complex was observed at 7.94 ppm, providing confirmation that the above compound had been formed.

A cyclohexane solution of the crystals (0.20 mmol) was added to the above prepared SBS polymer solution, and hydrogen was blown therein to a partial pressure of 1.2 MPa, under which hydrogenation was conducted at 90° C. When the degree of hydrogenation reached 80%, a cyclohexane solution of 0.20 mmol of the crystals was further added thereto, and the hydrogenation reaction was continued. After 30 minutes, the degree of hydrogenation reached 99%.

M was 11.9 mmol, Z 11.9 mmol, Al (Al in the Tebbe's complex) 0.40 mmol, and Ti 0.40 mmol, respectively, giving 0 for (M−Z+Al−Ti)/Ti.

EXAMPLE 8

In the same manner as in Example 1, a living polymer solution of an SBS terblock copolymer was prepared using an organic alkali metal compound as a polymerization initiator, and 11.9 mmol of ethanol was added thereto to deactivate the polymer terminals.

Separately, 0.1 mol of bis(n-butylcyclopentadienyl)-titanium dichloride (produced by Nippon Fine Chemical Co. Ltd.) and a hexane solution of 0.3 mol of trimethylaluminum were mixed and stirred at room temperature for 70 hours. The reaction mixture was evaporated to remove the volatile matter, and the residue was recrystallized. The crystals were analyzed by $^1$H-NMR in the same manner as for the Tebbe's reagent of Example 4. The peak at 7.15 ppm attributed to deutero benzene being taken as a reference peak, each peak was compared with the $^1$H-NMR spectrum of a Tebbe type complex in the literature (*J. Am. Chem. Soc.*, Vol. 100, pp. 3611–3613 (1978)). As a result, the peak of a methylene crosslink peculiar to a Tebbe type complex was observed at 7.94 ppm, providing confirmation that the above compound had been formed.

A cyclohexane solution of the crystals (0.20 mmol) was added to the above prepared SBS polymer solution, and hydrogen was blown therein to a partial pressure of 1.2 MPa, under which hydrogenation was conducted at 90° C. When the degree of hydrogenation reached 80%, a cyclohexane solution of 0.20 mmol of the crystals was further added thereto, and the hydrogenation reaction was continued. After 30 minutes, the degree of hydrogenation reached 99%.

M was 11.9 mmol, Z 11.9 mmol, Al (Al in the Tebbe's complex) 0.40 mmol, and Ti 0.40 mmol, respectively, giving 0 for (M−Z+Al−Ti)/Ti.

COMPARATIVE EXAMPLE 1

In the same manner as in Example 1, a living polymer solution of an SBS terblock copolymer was prepared using an organic alkali metal compound as a polymerization initiator, and 11.9 mmol of ethanol was added thereto to deactivate the polymer terminals. To the solution was added 4.7 mmol of sec-butyl lithium, and 0.47 mmol of Tebbe's reagent produced by Aldrich was further added. Hydrogen was blown therein to a partial pressure of 0.7 MPa, under which hydrogenation was conducted at 80° C. The degree of hydrogenation obtained after a 30-minute hydrogenation reaction was 33%.

M was 11.9+4.7=16.6 mmol, Z 11.9 mmol, Al 0.47 mmol, and Ti 0.47 mmol, respectively, giving 10 for (M−Z+Al−Ti)/Ti.

COMPARATIVE EXAMPLE 2

In the same manner as in Example 1, a living polymer solution of an SBS terblock copolymer was prepared using an organic alkali metal compound as a polymerization initiator, and 11.9 mmol of ethanol was added thereto to deactivate the polymer terminals. To the solution was added 1.9 mmol of sec-butyl lithium, and 0.47 mmol of Tebbe's reagent produced by Aldrich was further added. Hydrogen was blown therein to a partial pressure of 0.7 MPa, under which hydrogenation was conducted at 80° C. After 30 minutes, the degree of hydrogenation reached 63%.

M was 11.9+1.9=13.8 mmol, Z 11.9 mmol, Al 0.47 mmol, and Ti 0.47 mmol, respectively, giving 4 for (M−Z+Al−Ti)/Ti.

COMPARATIVE EXAMPLE 3

In the same manner as in Example 1, a living polymer solution of an SBS terblock copolymer was prepared using an organic alkali metal compound as a polymerization initiator, and 15.66 mmol of ethanol was added thereto to deactivate the polymer terminals. To the solution was added 0.47 mmol of Tebbe's reagent produced by Aldrich. Hydrogen was blown therein to a partial pressure of 0.7 MPa, under which hydrogenation was conducted at 80° C. After 30 minutes, the degree of hydrogenation was 35%.

M was 11.9 mmol, Z 15.66 mmol, Al 0.47 mmol, and Ti 0.47 mmol, respectively, giving −8 for (M−Z+Al−Ti)/Ti.

COMPARATIVE EXAMPLE 4

In the same manner as in Example 1, a living polymer solution of an SBS terblock copolymer was prepared using an organic alkali metal compound as a polymerization initiator, and 11.9 mmol of ethanol was added thereto to deactivate the polymer terminals.

Separately, a toluene solution of 0.94 mmol of titanocene dichloride (produced by Wako Pure Chemical Industries, Ltd.) and 6.2 mmol of triisobutylaluminum was stirred at room temperature for 20 minutes. A half portion of the reaction product was sampled and evaporated to remove the volatile matter. The residue was dissolved in a deutero benzene solution and analyzed by $^1$H-NMR in the same manner as in Example 1. The spectrum showed no proton absorption of the methylene crosslink peculiar to a Ti-Al metallacycle, indicating that a Tebbe type complex had not been formed.

The other half of the product was added to the above prepared SBS polymer solution, and hydrogen was blown therein to a partial pressure of 0.7 MPa, under which hydrogenation was conducted at 80° C. After 30 minutes, the degree of hydrogenation was 25%.

COMPARATIVE EXAMPLE 5

In the same manner as in Example 1, a living polymer solution of an SBS terblock copolymer was prepared using an organic alkali metal compound as a polymerization initiator, and 11.9 mmol of ethanol was added thereto to deactivate the polymer terminals.

Separately, a toluene solution of 0.94 mmol of titanocene dichloride (produced by Wako Pure Chemical Industries, Ltd.) and 6.2 mmol of triisobutylaluminum was stirred at room temperature for 100 hours. A half portion of the reaction product was sampled and evaporated to remove the volatile matter. The residue was dissolved in a deutero benzene solution and analyzed by $^1$H-NMR in the same manner as in Example 1. The spectrum showed no proton absorption of the methylene crosslink peculiar to a Ti-Al metallacycle, indicating that a Tebbe type complex had not been formed.

The other half of the product was added to the above prepared SBS polymer solution, and hydrogen was blown therein to a partial pressure of 0.7 MPa, under which hydrogenation was conducted at 80° C. The degree of hydrogenation after 30 minutes was 45%.

COMPARATIVE EXAMPLE 6

In the same manner as in Example 1, a living polymer solution of an SBS terblock copolymer was prepared using an organic alkali metal compound as a polymerization initiator, and 11.9 mmol of ethanol was added thereto to deactivate the polymer terminals.

Separately, a toluene solution of 0.94 mmol of titanocene dichloride (produced by Wako Pure Chemical Industries, Ltd.) and 6.2 mmol of diethylaluminum chloride was stirred at room temperature for 20 minutes. A half portion of the reaction product was sampled and evaporated to remove the volatile matter. The residue was dissolved in a deutero benzene solution and analyzed by $^1$H-NMR in the same manner as in Example 1. The spectrum showed no proton absorption of the methylene crosslink peculiar to a Ti-Al metallacycle, indicating that a Tebbe type complex had not been formed.

The other half of the product was added to the above prepared SBS polymer solution, and hydrogen was blown therein to a partial pressure of 0.7 MPa, under which hydrogenation was conducted at 80° C. After 30 minutes, the degree of hydrogenation was 15%.

COMPARATIVE EXAMPLE 7

In the same manner as in Example 1, a living polymer solution of an SBS terblock copolymer was prepared using an organic alkali metal compound as a polymerization initiator, and 11.9 mmol of ethanol was added thereto to deactivate the polymer terminals. To the solution were further added 0.94 mmol of trimethylaluminum and then 0.47 mmol of Tebbe's reagent made by Aldrich. Hydrogen was blown therein to a partial pressure of 0.7 MPa, under which hydrogenation-was conducted at 80° C. After 30 minutes, the degree of hydrogenation reached 48%.

COMPARATIVE EXAMPLE 8

In the same manner as in Example 1, a living polymer solution of an SBS terblock copolymer was prepared using an organic alkali metal compound as a polymerization initiator, and 11.9 mmol of ethanol was added thereto to deactivate the polymer terminals.

Separately, a cyclohexane solution of 0.94 mmol of titanocene dichloride (produced by Wako Pure Chemical Industries, Ltd.) and 1.88 mmol of trimethylaluminum was stirred at room temperature for 20 minutes. A half portion of the reaction product was sampled and evaporated to remove the volatile matter. The residue was dissolved in a deutero benzene solution and analyzed by $^1$H-NMR in the same manner as in Example 1. The spectrum showed no proton absorption of the methylene crosslink peculiar to a Ti-Al metallacycle, indicating that a Tebbe type complex had not been formed.

In the same manner as in Example 1, the other half of the product was added to the SBS polymer solution, and hydrogen was blown therein to a partial pressure of 0.7 MPa, under which hydrogenation was conducted at 80° C. After 30 minutes, the degree of hydrogenation reached 55%.

As described above, the present invention provides an industrially advantageous process for hydrogenating the double bond of a conjugated diene of a conjugated diene polymer obtained by using an organic alkali metal compound as a polymerization initiator which comprises contacting the polymer with hydrogen in an inert organic solvent, in which the catalyst used for hydrogenation is stable and easy to handle, an alkali metal compound as a cocatalyst is not required, the amount of the catalyst to be used is very small, and the hydrogenation proceeds quantitatively with good reproducibility over a broad range of temperature.

While the invention has been described in detail and with reference to specific examples thereof, it will be apparent to one skilled in the art that various changes and modifications can be made therein without departing from the spirit and scope thereof.

What is claimed is:

1. A process for hydrogenating a conjugated diene polymer, which process comprises the steps of:

deactivating a conjugated diene polymer which is prepared by using an organic alkali metal compound as a polymerization initiator by adding a deactivator; and contacting the deactivated diene polymer with hydrogen in an inert hydrocarbon solvent to hydrogenate the double bond of the deactivated diene polymer, wherein the hydrogenation is carried out:

(i) in the presence of a catalyst selected from organometallic compounds represented by the following formula:

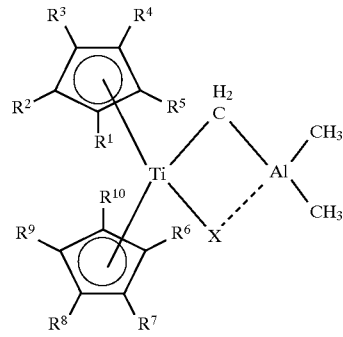

wherein $R^1$, $R^2$, $R^3$, $R^4$, $R^5$, $R^6$, $R^7$, $R^8$, $R^9$ and $R^{10}$, which may be the same or different, each represents a hydrogen atom, a hydrocarbon group having from 1 to 12 carbon atoms, or an alkylsilyl group having from 1 to 12 carbon atoms; and X represents a halogen atom or a methyl group; and (ii) under a condition satisfying the following relationship:

$$-6 < (M-Z+Al-Ti)/Ti < 2$$

wherein M represents the molar amount of the organic alkali metal compound; Z represents the molar amount of the deactivator; Al represents the molar amount of an organoaluminum compound; and Ti represents the molar amount of an organotitanium compound.

2. The process according to claim 1, wherein said inert hydrocarbon solvent is substantially free from a straight-chain ether compound.

3. The process according to claim 1, wherein said deactivator is added in an amount satisfying the relationship of $-5 \leq (M-Z)/Ti \leq 1.9$.

4. The process according to claim 1, wherein said hydrogenation is carried out under a condition satisfying the relationship of $-3 \leq (M-Z+Al-Ti)/Ti \leq 1$.

5. The process according to claim 1, wherein said catalyst is a reaction mixture of a titanocene dihalide and trimethylaluminum.

6. The process according to claim 1, wherein said hydrogenation is carried out in the presence of a tertiary amine compound.

* * * * *